April 6, 1926.
E. BUGATTI
1,580,011
VEHICLE WHEEL WITH COOLING DISK
Filed Jan. 8, 1925
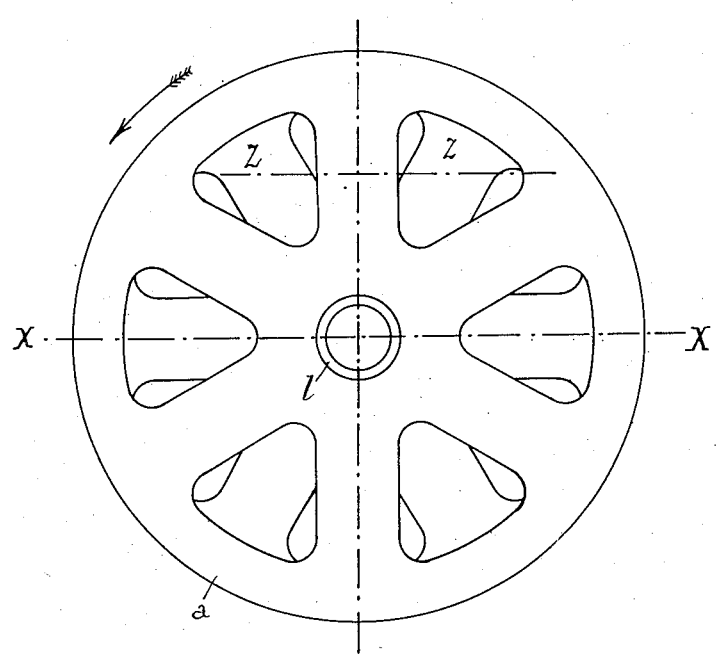
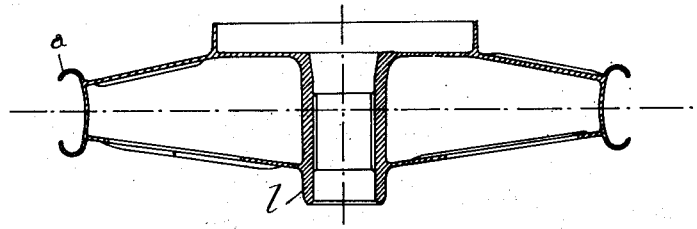
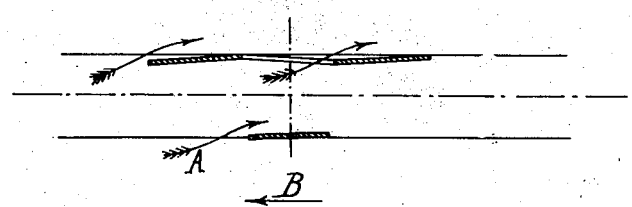

Patented Apr. 6, 1926.

1,580,011

UNITED STATES PATENT OFFICE.

ETTORE BUGATTI, OF MOLSHEIM, FRANCE.

VEHICLE WHEEL WITH COOLING DISK.

Application filed January 8, 1925. Serial No. 1,264.

*To all whom it may concern:*

Be it known that I, ETTORE BUGATTI, a subject of the King of Italy, and a resident of Molsheim, Bas-Rhin Department, France, have invented new and useful Improvements in Vehicle Wheels with Cooling Disks, which is fully set forth in the following specification.

The known types of wheels, either of wood or of metal with spokes or solid web, have a drawback consisting in the fact that they allow an abnormal heating of the pneumatic tires. This heating tends to produce an excessive pressure within the tire which increases with the speed and with the temperature of the air, and which may cause the bursting of the tire, if care has not been taken to inflate it only to a moderate degree at the outset. Another inconvenience is the heating of the brake drums during a long braking operation.

The present invention has for its object a wheel which is so constructed as to obviate the above-mentioned inconveniences to the maximum degree, and is constructed in such manner as to provide for an effective ventilation of the elements of the wheel.

The following description with reference to the appended drawings which are given by way of example sets forth an embodiment of the said invention.

Fig. 1 is a plan view of the wheel and

Fig. 2 a cross section on the line X—X.

Fig. 3 is a diagrammatic view representing a section of the wheel on the line Z—Z.

The said wheel consists of a rim *a* known per se, and a hub 1, these two parts being connected together by flat webs in such manner as to provide for the suitable shape of the arms which form so to speak the spokes of the wheel; said arms (Fig. 1) being placed in the staggered position. According to the invention, the said arms have a certain outward deflection (Fig. 3) in the direction of travel, according to the arrow B, Fig. 3, in order to form a ventilator when the vehicle is running.

The air passes through the wheel in the direction of the arrows A and due to its rapid circulation it will cool the wheel rim as well as the brake drum in an effective manner.

The wheel herein represented is made in a single piece, but it may otherwise consist of a wheel rim and a hub connected together by arms which are attached by autogenous welding, riveting or by like means.

What I claim is:

1. A wheel for motor vehicles wherein the spokes have an oblique position with reference to the plane of the wheel in such manner as to form a ventilator during the travel, thereby cooling the elements of the wheel.

2. A wheel for motor vehicles wherein the forward portion of the spokes in the direction of travel is deflected outwardly of the plane of the said wheel, said deflection being produced on the outer side of the spoke with reference to the vehicle body, in such manner as to form a ventilator during the travel, thereby cooling the elements of the wheel.

3. A wheel for motor vehicles in which the spokes are formed in a solid web, said spokes having their forward edges, in the direction of travel, slightly deflected towards the exterior, said deflection being produced on the outer side of the spoke with reference to the vehicle body.

In testimony whereof I have signed this specification.

ETTORE BUGATTI.